United States Patent [19]

Heiss et al.

[11] Patent Number: 5,731,963
[45] Date of Patent: Mar. 24, 1998

[54] HOUSING FOR A RADIO DEVICE HAVING A THIN ELECTRICALLY CONDUCTIVE FILM APPLIED TO AN EXTERIOR SURFACE THEREOF

[75] Inventors: Reinhold Heiss, Duetenhausen; Friedrich Schroeder, Wesel, both of Germany

[73] Assignee: Siemens Aktiengesellschaft, Munich, Germany

[21] Appl. No.: 616,631

[22] Filed: Mar. 15, 1996

[30] Foreign Application Priority Data

Apr. 24, 1995 [DE] Germany ........................ 195 15 010.4

[51] Int. Cl.$^6$ ........................................................ H04B 1/03
[52] U.S. Cl. ............................ 361/814; 361/753; 361/816; 361/818; 361/799; 174/51; 174/35 R; 455/89; 455/90
[58] Field of Search ........................ 361/736, 752, 361/753, 799, 796, 800, 802, 814, 816, 181; 174/35 R, 35 TS, 35 GC, 51; 455/89, 90, 91, 347, 348, 345, 300, 301, 351, 128, 129

[56] References Cited

U.S. PATENT DOCUMENTS 5,392,461  2/1995  Yokoyama ........................ 455/89

*Primary Examiner*—Michael W. Phillips
*Assistant Examiner*—Anthony Dinkins
*Attorney, Agent, or Firm*—Hill, Steadman & Simpson

[57] ABSTRACT

A housing is provided for a radio device, such as a portable cellular telephone, in a housing arrangement which includes an integral electromagnetic shield. A thin conductive film is applied to an interior or exterior surface of one or more shell-type housing parts. This thin film may be applied during an injection molding process to form the shell-type parts. The shell-type parts are shaped to define a cavity for encasing electronic components of the radio device, and for securably receiving an associated circuit board. The thin film is disposed to extend over a supporting edge of the corresponding housing part so that circuit board grounding surfaces are in low-resistance contact with the shielding film. The film thereby provides the housing with an integrated shielding function against electromagnetic radiation.

14 Claims, 2 Drawing Sheets

HOUSING FOR A RADIO DEVICE HAVING A THIN ELECTRICALLY CONDUCTIVE FILM APPLIED TO AN EXTERIOR SURFACE THEREOF

BACKGROUND OF THE INVENTION

The present invention relates to a housing for a radio or cellular telephone. More specifically, the present invention relates to such a housing consisting of shell-type parts for encasing electronic components. These housing shell parts are cooperatively shaped to lie against one another as a unit.

In radio devices, such as portable cellular telephones, a shielding means is usually necessary for protecting the radio and logic modules against interference from incoming and outgoing electromagnetic radiation. Conventional shielding components include soldered shielding frames, shielding plates, metallized plastic housings or die-cast housings. Such conventional components add weight, volume, and expense to the device. Moreover, assembly of such conventional components is often problematic, lowering the production quality.

Housings are known which are made of metallized or plated plastic parts. Unfortunately, such housings are expensive and provide inadequate shielding.

Therefore, a general object of the present invention is to provide an improved shield integral to a structural housing component which has a simple construction and gives a good shielding effect.

SUMMARY OF THE INVENTION

The aforementioned object is inventively achieved by providing a housing having two shell-type parts which together define an interior cavity for encapsulating a circuit board with electronic components for the radio device. According to the invention, a thin shielding film is applied inseparably to a surface of at least one of the shell-type parts. As used herein, this inseparable application of film includes spray-coating, fusing, painting, co-injection or other suitable forms of permanent lamination. The applied film extends over a surface of the shell member against which the circuit board is supported. Thereby, the thin film contacts grounding surfaces of the circuit board in a low-resistance manner.

The shells are secured together in a manner which firmly holds the circuit board therebetween. For example in one embodiment, the circuit board is sandwiched between opposed edges of the upper and lower shell members. The film extends between the lower shell member and the circuit board in order to provide the desired grounding contact. In another embodiment, the lower shell member is stepped in shape to form a recessed step for receiving and supporting the circuit board. The film extends over the lower surface of this step for contacting the grounding surfaces of the circuit board.

According to various aspects of the present invention, the film may be applied to either an interior or exterior surface of the associated housing shell parts. In both embodiments, the film extends over a supporting edge of the corresponding housing shell to contact grounding surfaces of the circuit board. Particularly in the exteriorly-applied embodiment, the film may be provided with a graphic design for aesthetically enhancing the appearance of the radio device, advertising, brand identification, etc.

Because the housing shell members may be made of injection-molded plastic, the film may be applied during this injection-molding process. More specifically, the film may be injected on or spray-coated to the housing shell parts. Also, the film may be conducted through the die.

An advantage of the present invention is to provide a housing for a radio device or cellular telephone which has an integrated shielding function.

Another advantage of the present invention is to provide an electromagnetically shielding housing which is simple and inexpensive to manufacture.

Yet another advantage of the present invention is to provide a shielding housing which maintains secure low-resistance contact with grounding surfaces of the circuit board.

Still another advantage of the present invention is to provide a shielding housing wherein the shielding film aesthetically enhances the radio device.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
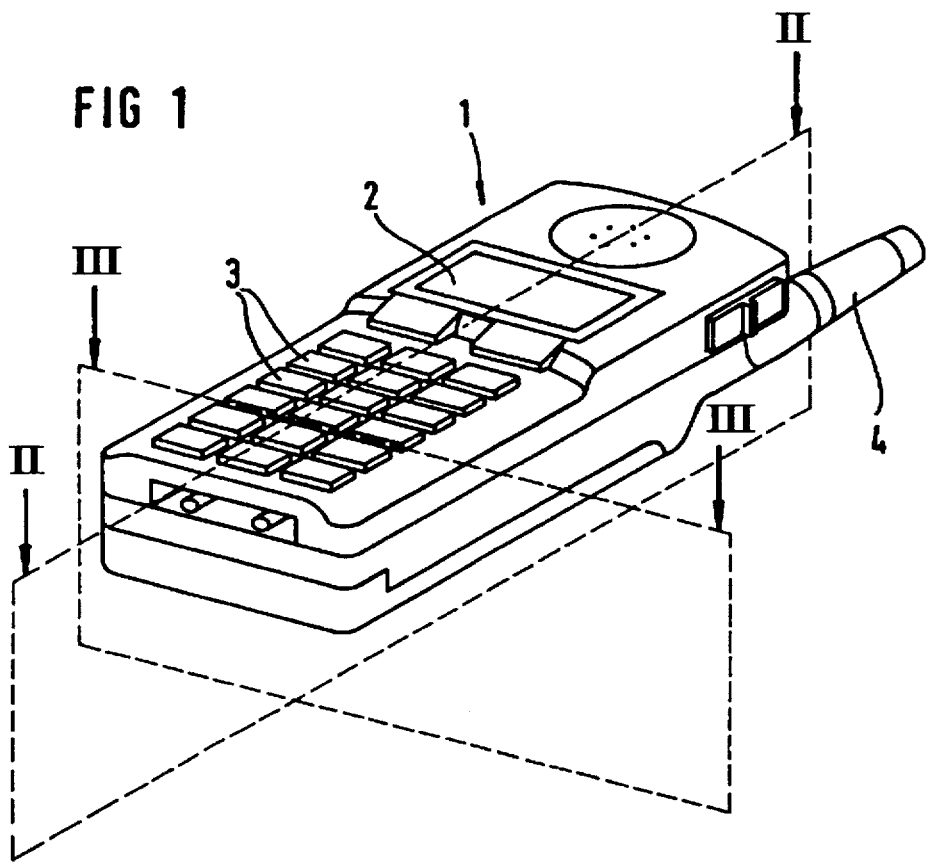
FIG. 1 is a perspective view of a portable cellular telephone having a housing in accordance with the present invention.
Figure 2:
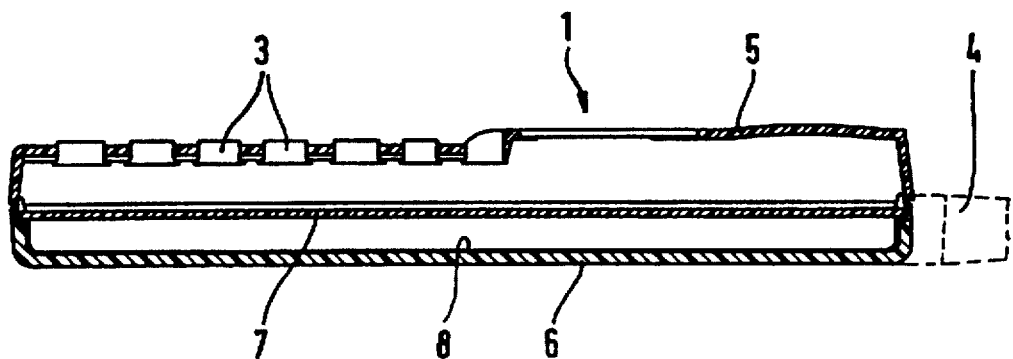
FIG. 2 is a side sectional view taken generally through plane II—II in FIG. 1.

Now turning to the Figures, the present invention is hereinafter described with reference to FIGS. 1–6, showing a radio device 1 which incorporates features according to the present invention. As illustrated in FIGS. 1 and 2, the radio device has an upper side with a readout display 2 as well as a keypad 3. An antenna 4 is located generally toward a side of a top of the radio device 1. A housing of the radio device 1, includes an upper shell 5 and a lower shell 6. These shells 5 and 6 may be formed by an injection molding process. The upper shell 5 and lower shell 6 are arranged with concave or open sides facing one another to define an interior cavity and so that the shells generally lie against one another. The upper shell 5 includes openings for the display 2 and for the keypad 3. In a plane lying generally parallel and between the housing shells 5 and 6, the radio device 1 has a circuit board 7 which may accept various components, including electronic radio and logic modules of the radio device 1. The circuit board 7 is illustrated in FIGS. 2–5.

According to the invention, the housing provides an integral shielding function. This feature is implemented through use of an in-mold technology. Specifically, a very thin film 8 is injected or spray-coated onto the structural components of the housing (e.g., the shells 5 or 6) during the injection process, so that the film 8 is conducted through the injection die (not shown). In order to achieved a desired shielding affect, these films are electrically conductive. The film may be located at an interior or exterior side of the housing. Moreover, the film is arranged to contact grounding surfaces of the circuit board.

Figure 3:
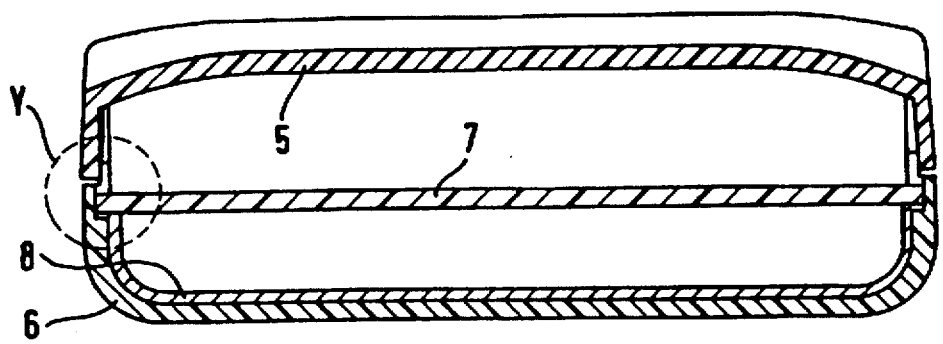
FIG. 3 is a sectional view taken generally through plane III—III in FIG. 1.

To this end, in an exemplary embodiment as illustrated in FIGS. 2 and 3, an electrically conductive film 8 is deposited on an interior surface of the lower housing shell 6. Thereby, an electromagnetically well-shielded space is formed between the circuit board 7 and the lower housing shell 6.

Figure 4:
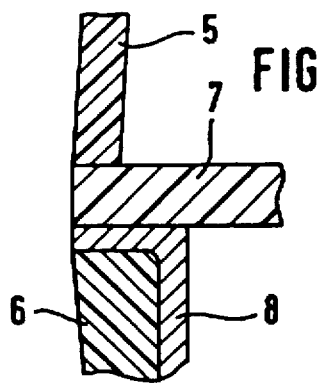
FIG. 4 is a fragmentary view illustrating a cooperative engagement of components according to an embodiment of the invention.
Figure 5:
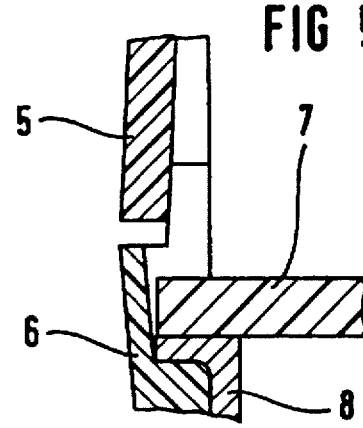
FIG. 5 is a fragmentary sectional view representing an enlargement of area Y indicated in FIG. 3.

FIGS. 4 and 5 illustrate a support area of the circuit board 7 at a region where the upper and lower shells 5 and 6 come together. In the embodiment of FIG. 4, the electrically conductive film 8 extends over an upper edge of the lower shell 6 where the film 8 makes contact with a grounding surface of the circuit board 7. In the embodiment of FIG. 5, an upper edge of the lower shell 6 is interiorly stepped in shape. The film 8 extends over a lower surface of this step, and the circuit board 7 is received in the step against the film 8. This contact against the circuit board 7 provides a low-resistance contact between the film 8 and the grounding surfaces of the circuit board 7.

Figure 6:
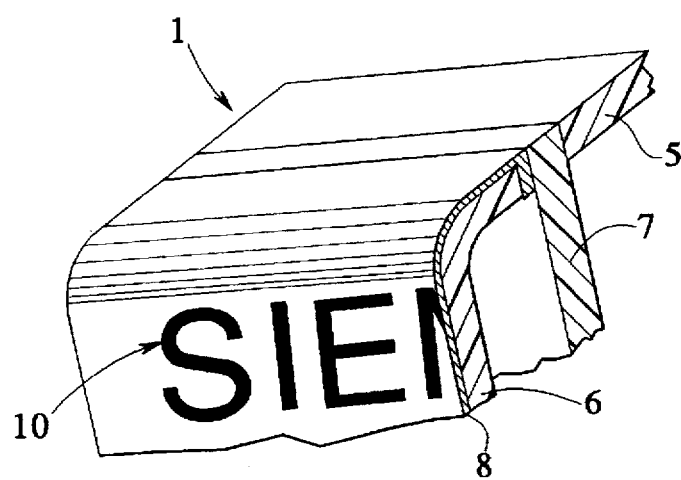
FIG. 6 is a perspective view of a portable cellular telephone having a housing in accordance with an embodiment of the invention.

In a particular embodiment illustrated in FIG. 6, the film 8 may be provided on an exterior surface of the housing shell 5 or 6. In this embodiment, the film may be provided with a graphic representation 10 to enhance the ornamentality of the housing. Still, in this embodiment, the film extends over a support edge of the circuit board 7 in order to maintain a low-resistance grounding contact with the circuit board grounding surfaces.

It should be understood that various changes and modifications to the presently preferred embodiments will be apparent to those skilled in the art. Such changes and modifications may be made without departing from the spirit and scope of the present invention. Therefore, the appended claims are intended to cover such changes and modifications.

What is claimed:

1. A housing for a radio device, the housing comprising:
   at least two shell-type parts arranged to lie against one another to define a cavity for encasing radio components;
   at least one of the shell-type parts having a thin electrically conductive film applied to an exterior surface thereof for electromagnetically shielding said cavity.

2. The housing according to claim 1 wherein the shell-type parts are injection-molded and said film is injected onto said at least one shell-type part during molding.

3. The housing according to claim 2, wherein the film is conducted through an injection die.

4. The housing according to claim 2, wherein the film provides a low-resistance contact to grounding surfaces of a circuit board assembled generally between said shell-type parts, at the connection to said circuit board.

5. The housing according to claim 2, wherein the film includes a graphic design incorporated into the exterior surface.

6. The housing according to claim 2, wherein the film is disposed to contact a grounding connection to a circuit board.

7. An electromagnetically-shielding housing for a radio device, the housing comprising:
   at least one shell part encasing a circuit board therein; and
   a conductive film fused to an exterior surface of the shell part.

8. The housing according to claim 7, wherein the shell part has an edge for supporting the circuit board, the film extending over the edge to contact at least one grounding surface of the circuit board.

9. The housing according to claim 7, wherein the housing includes two shell members which cooperatively encase the circuit board.

10. The housing according to claim 9, wherein the shell members define an interior cavity for encasing the circuit board.

11. The housing according to claim 7, wherein the film is applied by injection.

12. An electromagnetically-shielding housing for a radio device, the housing comprising:
    at least two shell parts which cooperatively fit together to form a cavity for enclosing a circuit board, the circuit board being supported against a support edge of at least one shell part; and
    a film covering an exterior side of at least one of said shell parts and said support edge to contact a grounding surface of the circuit board.

13. The housing according to claim 12, wherein the circuit board is securable between opposed edges of the shell parts.

14. An electromagnetically-shielding housing for a radio device, the housing comprising:
    at least two shell parts which cooperatively fit together to form a cavity for enclosing a circuit board;
    a support edge on at least one shell part;
    a stepped recess in the support edge to receive the circuit board; and
    a film covering an exterior side of at least one of the shell parts and the stepped recess to contact a grounding surface of the circuit board.

* * * * *